United States Patent
Saucier

(10) Patent No.: US 6,720,911 B2
(45) Date of Patent: Apr. 13, 2004

(54) METHOD AND APPARATUS FOR REDUCING THE AMOUNT OF SHIPBOARD-COLLECTED CALIBRATION DATA

(75) Inventor: Norman E. Saucier, New Ipswich, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 59 days.

(21) Appl. No.: 10/218,945

(22) Filed: Aug. 14, 2002

(65) Prior Publication Data

US 2004/0032364 A1 Feb. 19, 2004

(51) Int. Cl.$^7$ .............................. G01S 7/40; G01S 13/48
(52) U.S. Cl. .................... 342/174; 342/156; 342/173; 342/195
(58) Field of Search .................. 342/165–175, 342/195, 368, 369–384, 417–449, 147–158

(56) References Cited

U.S. PATENT DOCUMENTS

| | | | | |
|---|---|---|---|---|
| 4,494,118 A | * | 1/1985 | Graves | 342/424 |
| 4,673,944 A | * | 6/1987 | Graves | 342/424 |
| 4,975,710 A | * | 12/1990 | Baghdady | 342/442 |
| 4,992,796 A | * | 2/1991 | Apostolos | 446/424 |
| 6,255,992 B1 | * | 7/2001 | Madden | 342/424 |

\* cited by examiner

*Primary Examiner*—Bernarr E. Gregory
(74) *Attorney, Agent, or Firm*—Daniel J. Long

(57) ABSTRACT

A system is provided for reducing the time that a ship must be maintained on station to collect calibration data by reducing the frequencies at which calibration data is to be collected. Since it is impractical to consider calibrating over elevation angle and polarization on the full-scale ship, an accurate scale model and test facility are utilized, with surface wave data being collected from the ship before model-based data can be utilized. In the subject system, the number of calibration frequencies used aboard ship is dramatically reduced by as much as 80%, thus reducing the time the ship must be on station when doing a calibration run. In one embodiment, the shipboard surface wave data for one elevation and one polarization is combined with surface wave and sky wave data from the scale model to generate an array manifold or database used in subsequent direction finding activities. In order to minimize the frequencies at which shipboard data is collected, the set of frequencies used for shipboard calibration is limited to a subset of all the original calibration frequencies. The number of frequencies used for shipboard calibration is reduced by selecting frequencies which generate adjustment, or weighting factors which are valid over a wide bandwidth.

13 Claims, 5 Drawing Sheets

METHOD AND APPARATUS FOR REDUCING THE AMOUNT OF SHIPBOARD-COLLECTED CALIBRATION DATA

FIELD OF INVENTION

This invention relates to calibration of arrays of direction finding antennas and more particularly to antenna array calibration using a reduced set of sampling frequencies.

BACKGROUND OF THE INVENTION

The inherent accuracy of correlation interferometer direction finding, CIDF, algorithms is described by characterizing all the direction finding antenna array responses in terms of amplitude, and phase or I&Q. In order to characterize the array, one develops a system resident, direction finding, DF database array manifold that contains the antenna responses. This characterization process is called calibration. Calibration data is measured and recorded over many frequencies and azimuths for selected elevation/depression angles and polarizations depending on the DF system requirements in order to produce a DF manifold or database.

Array manifold development is generally obtained by measuring and recording antenna data from the DF array installed on the ship, editing the data to filter out bad measurements, interpolating the data to produce the required array manifold azimuth distribution, and formatting the data for system installation.

In the past, there were two test measurements that were used to generate the array manifold. The first measurement was a surface wave measurement which involved measuring the antenna array response to signals originating from a known location that follow the curvature of the earth from on-shore. The second set of calibration values came from sky wave measurements which measure the response of the array to signals that are reflected by the ionosphere down to the antenna array. Since it is impractical to measure sky wave response on a ship, calibration, in the past, has involved the use of brass ship models which are $\frac{1}{48}$th scale models of the ships in question. In order to do the calibration, the scale model is provided with loop type antennas at the positions about the ship that mimic those for the full-scale platform.

The scale model is then rotated relative to a calibration source so as to provide the surface wave and sky wave data. These measurements are taken at all frequencies of interest, which typically number 90 in a band from 1 MHz to 30 MHz.

There is, however, a difference between the results from the model and those from the full-scale platform or ship. In order to adjust the results from the model to match those of the ship, a complex optimization procedure is used which involves generating complex weights that are used to correct the response of the scale model array so that it corresponds to the shipboard array.

Key to making sure that direction-finding using such an array is effective, calibration procedures involve the selection of a number of frequencies at which signals are expected to arrive. As mentioned above, typically 90 such frequencies cover a range of 1 MHz and 30 MHz. It will be appreciated that with respect to surface wave calibration, the calibration antenna must transmit signals at these 90 frequencies to the ship, and the response of the shipboard antenna array is measured for each of these frequencies at 2° increments in azimuth angle so that a database called an array manifold is created.

In order for all 90 frequencies to be sampled at 360 different azimuth angles, a ship can be on station for as long as 36 hours. To obtain the required data, the ship must steam in circles, for instance, ten miles away from a shore station that is transmitting calibration signals so that the response of the shipborne array can be measured. These measurements are then used with surface wave and sky wave measurements from the scale model to generate an array manifold or database. Signals from the antenna array aboard the ship are subsequently used to generate complex weights which will adjust the model array response such that when these normalized signals are passed to a direction finding algorithm, the result is an accurate line of bearing angle between the ship and the electromagnetic source.

Note that once the surface wave components of the calibration have been generated at sea, the resulting characterization array is used in combination with the scale model to generate the weights for a full complement of frequencies for both surface waves and sky waves. Thus, having characterized the shipboard array and having data from the corresponding scale model, it is then possible to calculate weights which are to be applied to the model array data so as to correct them or normalize them to be able to be used by the direction finding system on the ship.

The problem with this calibration method is that getting the surface wave measurements at sea takes a long time. This is because ship must be rotated through a full 360° for each sampling frequency.

SUMMARY OF THE INVENTION

In order to eliminate having to sample all frequencies which are deemed to be important on a shipboard calibration run, it has been found that the weights associated with selected frequencies are valid across a wide bandwidth. This means that weights generated at one frequency are valid for a number of adjacent frequencies. As a result, the number of frequencies involved in the shipboard calibration phase can be reduced by as much as 80%.

Were the bandwidth of the complex weights at all frequencies uniform and linear, then all that would be necessary would be to simply divide up the total bandwidth into a convenient subset of equally-spaced frequencies. However, due to scattering and edge effects as well as other topographical artifacts associated with the ship, during the initial placement of the antennas, a frequency regime is set up in which the frequencies at which calibration measurements are specified. These frequencies are more dense in some regions, whereas in other regions, there is a less dense number of calibration frequencies.

It has been found that the complex weights to be specified in the manifold or dataset are useful over a broad range of frequencies. Thus, weights for one frequency will work over a number of adjacent frequencies. As a result, one can get broadband performance out of a set of complex weights.

Whereby the complex weights need be provided only for a reduced set of the originally specified calibration frequencies.

For shipboard calibration measurement in order to reduce the total number of frequencies to about 15–20% of the original number, one must be careful not to remove too many frequencies in regions where the density of calibration frequencies is high. The density of calibration frequencies is high when there are resonances causing the antenna patterns to change very quickly. Here it is necessary to provide a larger number of calibration frequencies, although still less than the original number of calibration frequencies determined from a scale model of the ship. Where there are less dense frequencies even less numbers of calibration frequencies need to be provided. What this means is that one is culling the calibration frequencies at which one wants to sample and eliminates those frequencies based on the characteristics of the antenna array and the topside configuration of the ship.

As to what calibration frequencies are initially picked, and from which one can ascertain frequency density, the frequencies picked relate to direction finding error based on the results of direction finding using the original model. This results in a set of calibration frequencies.

How this is done is as follows: Considering a frequency of interest that is halfway between two frequencies, there is going to be a direction finding error associated with it because one is not on the calibration frequency anymore. How far a target frequency can be from a calibration frequency and still be within an acceptable DF error defines band edge error. When the band edge error is above some limit, one needs to add another calibration frequency. Thus band edge error establishes frequency density.

It has been found that more dense calibration frequency densities occur when antenna array patterns are changing quite rapidly with frequency. Less dense frequencies occur there the array patterns change slowly. As a result, one can eliminate a large number of calibration frequencies used in frequency bands where the antenna pattern characteristics are not changing very quickly. The antenna characteristics which are changing slowly are those whose amplitude and phase patterns and the ensemble characteristics of the entire direction finding array vary little with frequency and azimuth.

One, however, cannot drop large numbers of frequencies where all the antennas are changing so fast that the bandwidth of the complex weights for the array manifold becomes reduced. What this means is that the antenna patterns are changing very fast with respect to azimuth and frequency on board the ship, with the changes being a function of the scattering from different superstructure configurations, topside configurations and antennas that may be in the area. When all of these configurations start to resonate, inter-resonances can affect neighboring antennas, therefore making the patterns change very quickly. Thus, in some frequency bands, the patterns change much more rapidly than others because of these resonances.

The result is that if, for instance, one has one region of very dense frequencies, and the remainder not dense at all, one could have 10 frequencies in the dense frequency zone and 5 frequencies spread out over the rest of the band. Thus, sampling at only 15 frequencies, as opposed to 90 frequencies is sufficient for the calibration process.

More particularly, calibration for sky wave direction finding involves the use of a combination of platform and scale model data to form an array manifold or database required for correlation interferometer direction finding and polarization independent correlation interferometer direction finding correlation interferometer direction finding CIDF algorithms. In one embodiment, multi-dimensional arrays are comprised of DF antenna measurements recorded over frequency, azimuth, elevation and polarization. Calibration is normally performed in two stages, with the first stage being an at sea calibration which forms the surface wave segment of the array manifold. The second stage is the sky wave calibration required for polarization independent CIDF algorithms. The sky wave calibration process characterizes the DF antenna responses over frequency, azimuth and elevation angle for both vertical and horizontal polarization. If the antenna array response were linear than one could simply equally divide the number of frequencies at which data is collected by some number. However, due to scatter and edge characteristics, the original density of sampling frequencies is taken into account, with the reduced set of frequencies having increased numbers of components for dense sets of frequencies, and an even further reduced set of frequencies for less dense sets of frequencies. Thus, shipboard calibration exercises which typically involved one or more days, can now be reduced to a matter of hours, with the remainder of the data being derived from scale model testing such that the array manifold or data set used aboard the ship is a result more of scale model testing than it is of shipboard testing.

One way to find out initially as to where the antenna characteristics change rapidly is to make an initial sweep of all of the azimuths and measure what is actually happening with the antenna pattern in terms of amplitude and phase versus azimuth.

This type of analysis can be done using a scale model that is part of the model study that is used to define the best antenna locations for that ship. This is the process that indicates what calibration frequencies are needed for the particular shipboard platform.

The way that one understands what frequencies need to be sampled and the ones that can be ignored is to take the original calibration frequencies distribution data based on the model and see where there is very little change between frequencies for the antenna pattern. Thus, for instance, for a given antenna configuration on a ship, if at a certain set of frequencies there is very little change in antenna pattern, then one need not sample very many frequencies about this frequency in order to be able to calculate weights for correcting the model data with observed data from shipboard.

In short, one determines the frequencies at which the antenna pattern is changing most rapidly and then uses those weights in a broadband sense for adjacent frequencies within a set band. In order to determine which frequencies the pattern of the ensemble of antennas changes most rapidly, a direction finding algorithm is invoked and a scale model is used to generate the outputs of all of the antennas. These outputs are coupled to a direction finding unit, with the accuracy of the DF bearing line from the source of radiation to the model determining band edge error, i.e., how fast or how slow the pattern changes. In other words, an indirect method is used to determine through the accuracy of the direction finding test which of the frequencies are most important to sample.

In operation, using the scale model, one collects data at a first frequency with the data being sampled at a full complement azimuths angles around 360°. Now one migrates the calibration frequency and collects data again. The second set of data invokes the direction finding algorithm against the previous frequency and comes up with an RMS error over the 360° angles of azimuth for that frequency. This is retained. Then one moves up in frequency a bit and the process is repeated against the first frequency. One is therefore DFing this new set of frequencies that is higher, against the base frequency that was the first one at which data was collected. This process is repeated with ever increasing frequencies until the RMS data approaches or hits an accuracy stop. This is a threshold at which using the original weights the accuracy of the direction finding result is not sufficient. This is called the band edge. One then selects a frequency between the band edge frequency and the original frequency as a delta which is added to the last frequency to arrive at the next calibration frequency.

The result of doing this on an iterative basis is a series of calibration frequencies throughout the entire frequency band of interest and therefore defines the calibration frequency distribution. The process therefore is a base frequency set that is used for the calibration array manifold. This process, in essence, tells one where the 90 calibration frequencies should be.

Note that the reduction in calibration frequencies made possible by the subject invention comes from the realization of the broadband capability of the complex optimization weights. One does not have to know which frequencies to use. It is a finding of the subject invention that there will be a significant reduction of frequencies necessary because one expects these complex weights to have some broadband capability. The broadest band of these complex weights will occur where the frequency set is not dense, whereas more narrow band weights are going to come from those frequency bands having calibration frequencies which are inherently more dense. A selection of which frequencies to use is such that if the frequency distribution were uniform from frequency 1 to frequency 90, then one would simply divide the number of frequencies by, for instance, 10 and use these weights centered around these frequencies.

However, if the original model for which the antennas were characterized indicated that there was a bunching up or increased density of frequencies for which measurements are to be made, and then one concentrates the weights towards those bunched up or highly dense frequency distributions.

Thus, in order to select those frequencies for which a weight is applicable, one looks at the density of the frequencies obtained from the original modeling. Where the density of the frequencies is high, the frequencies selected for the weights is more numerous. This means that the bandwidth of the complex weights utilized by this area will be reduced.

For this reduced bandwidth, one would then collect shipboard data at more frequencies than would be indicated from the fundamentally less dense frequency band. Thus, for instance, one might sample 10 frequencies in a dense region, whereas for the rest of the entire frequency band, one might only use 5 frequencies.

It will be appreciated that the exact frequency is not so important for a dense frequency distribution. It is a fact rather that choosing a large number of sample frequencies within that dense frequency range is what is required.

In summary, a system is provided for reducing the time that a ship must be maintained on station to collect calibration data by reducing the frequencies at which calibration data is to be collected. Since it is impractical to consider calibrating over elevation angle and polarization on the full-scale ship, an accurate scale model and test facility are utilized, however, with surface wave data being collected from the ship before model-based data can be utilized. In the subject system, the number of calibration frequencies used aboard ship is dramatically reduced by as much as 80%, thus reducing the time the ship must be on station when doing a calibration run. In one embodiment, the shipboard surface wave data for one elevation and one polarization is combined with surface wave and sky wave data from the scale model to generate an array manifold or database used in subsequent direction finding activities. In order to minimize the frequencies at which shipboard data is collected, the set of frequencies used for shipboard calibration is limited to a subset of all the frequencies used in the calibration. The number of frequencies used for shipboard calibration is reduced by selecting frequencies which are valid over a wide bandwidth.

BRIEF DESCRIPTION OF THE DRAWINGS

These and other features of the subject invention will be better understood in connection with the Detailed Description in conjunction with the Drawings of which.

DETAILED DESCRIPTION

Figure 1:
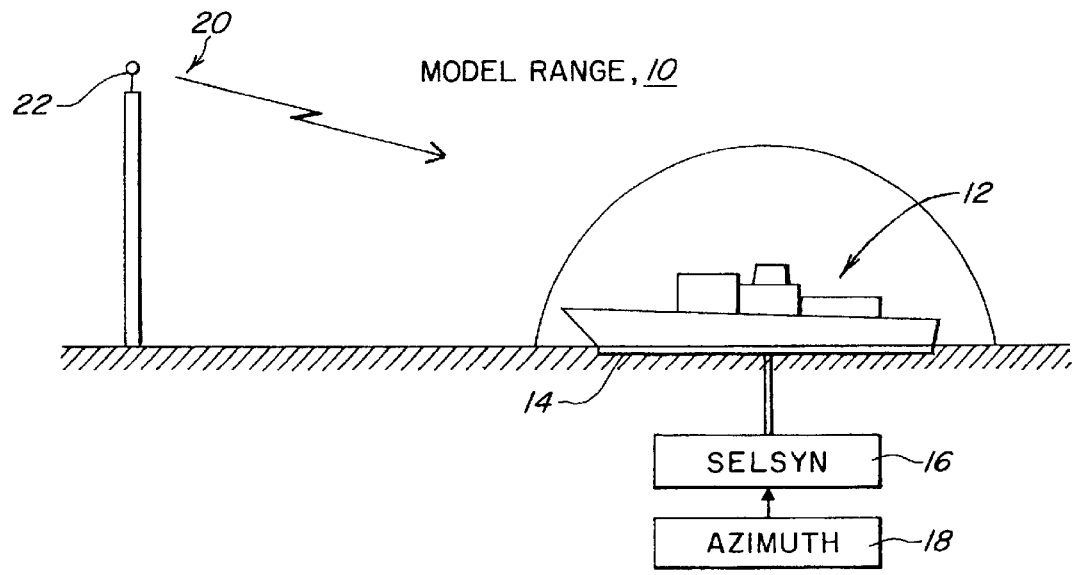
FIG. 1 is a diagrammatic illustration of the measurement of calibration signals from a brass model of a ship using a model range.

By way of further background, the algorithms that are typically used in direction-finding for shipboard and as a matter of fact for airborne applications require that one characterize the antennas that are located that make up the direction finding array. One characterizes them as a function of frequency and as a function of azimuth angles so that one knows what the complex patterns look like. Those patterns ultimately go into a direction finding array manifold or a database which is part of the system.

With respect to what type of data is necessary to completely characterize the DF scenario, there are two different types of data: one is surface wave data and the other is sky wave data. Currently, the way this is accomplished is to collect data from the actual ship at sea at 0° elevation which is called surface wave data. The sky wave portion of the database comes from a scale model. The two sets of data are combined to form the final database that goes into the system. So it is a combination of actual ship data for the surface wave segment and model data for the sky wave segment. However, the model data has to be adjusted with the above optimization technique before one makes the final array manifold over the final database. So the current technique is ship data plus model data.

Now, in order to obtain all the data needed, in one instance, one must sample all 90 frequencies. That is not only ship data which is surface wave data, but also for the model data that is both ship data and sky wave data. The surface wave segment and the sky wave segment of the model data are used in conjunction with the ship surface wave data to develop the above-mentioned complex weighting factors. These complex weighting factors are then used to adjust the rest of the sky wave model data. So in terms of swinging the ship, in the prior art, the ships had to be swung by 2° increments around 360° for each of the 90 frequencies of interest, which took anywhere from 24 to 36 hours to do an at-sea shipboard calibration.

The result with the subject invention is that one will not have to keep the ship out at sea for 24 to 36 hours; but only collect a reduced set of calibration frequencies at sea on the ship. With that reduced set, one can use the complex optimization process in conjunction with the model data to develop the full database. In other words, using the subject system the database is comprised mainly of model data. Even the surface wave segment is adjusted model data. As a result of the subject invention, one does not have the full set anymore from the ship because one has decided not to collect all that data at sea.

As an example, if one had originally 90 frequencies for which one had to collect data for each of the 2° increments in azimuth, this can be reduced down to about 15 or 20 where the emphasis is to collect data at frequencies where there are resonances and where the antenna patterns are changing very quickly.

For shipboard applications, in the past, one has a set of frequencies that number roughly 90 which are collected at sea for one particular polarization and one particular elevation angle for surface waves. The other segment of the database is made up of model data, where one would characterize the data at the same frequencies that one would characterize the antennas for, not only surface waves but as also a function of different elevation angles, typically every 10° or so in elevation from 0° on up to 80°. Taking into account vertical and horizontal polarizations, combining the shipboard data with the model data gives one a total array manifold that eventually goes into the system.

How the subject system operates to reduce the number of calibration frequencies used at sea is now described.

Referring now to FIG. 1, in order to be able to calibrate an array of antennas on a full sized platform, a model range 10 is used in which a scale model 12 of a ship is provided on a rotating platform 14 driven by a selsyn 16 so as to control the azimuth angle 18 between the center line of the ship and an electromagnetic source 20 which includes an antenna 22 that radiates electromagnetic radiation of a predetermined frequency towards model 12.

Figure 2:
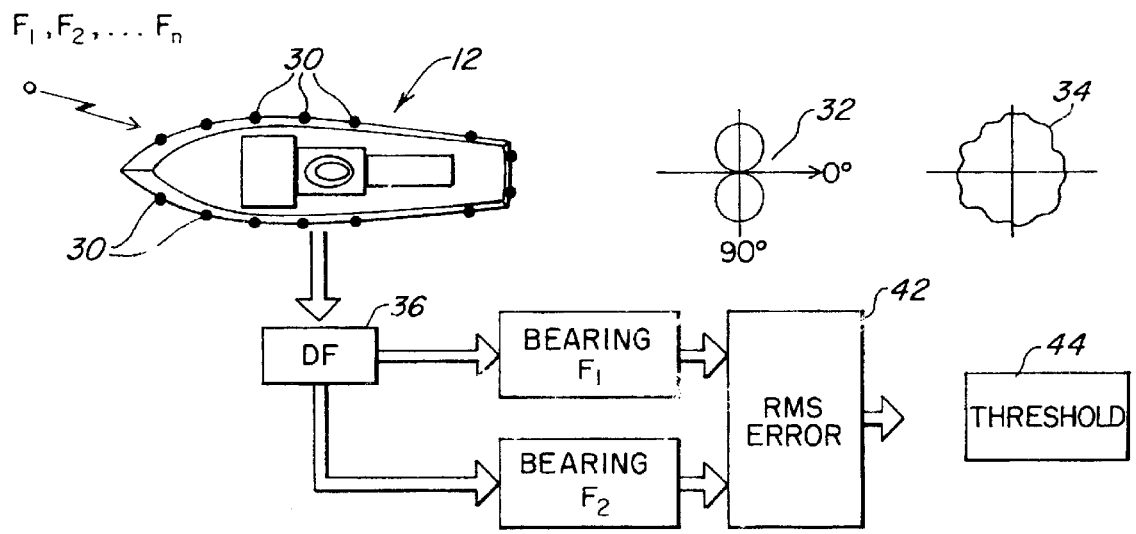
FIG. 2 is a diagrammatic illustration of the placement of an array of antennas on a ship model illustrating the generation of the RMS error which is used in setting the band edges used in specifying the original calibration frequencies for use in characterizing the antenna array, also showing the effect of shipboard characteristics on the original antenna pattern of each of the antennas of the array.

As can be seen in FIG. 2, model 12 has an array of antennas 30 which are positioned corresponding to matching positions on the full-scale platform, i.e., the ship, and which have characteristics matched to the same antennas used on the full-scale platform.

Because of the resonances and interferences between the antennas and various artifacts or edges on the ship, the normal antenna pattern 32 of each of the antennas is distorted as illustrated at 34 due to these resonances.

In order to compensate for these distortions, the first step is to specify calibration frequencies for this particular model through a system which direction finds on the output of the antenna array as illustrated at 36. This process provides a bearing line 38 for the first calibration frequency F1. After this bearing line has been ascertained, a second bearing line at a second frequency F2 is determined at 40 and the two bearing lines are compared at an RMS error generator 42 to provide and RMS error figure which is applied to a threshold circuit 44. Frequencies F3 . . . $F_n$ are sequentially transmitted to the array on the model and when an error threshold has been exceeded, a band edge has been defined.

Figure 3:
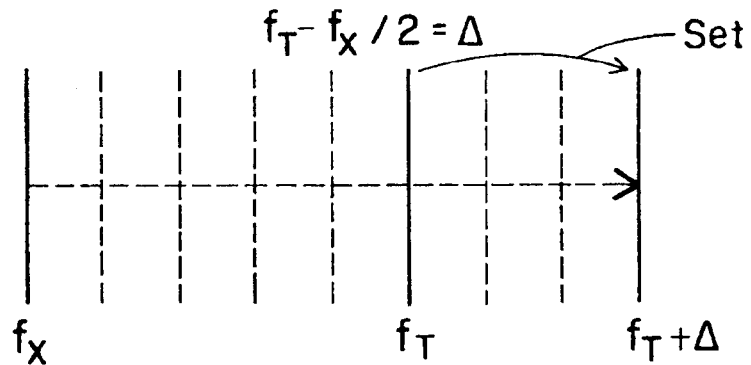
FIG. 3 is a diagrammatic illustration of the setting of the calibration frequencies from the original measurements from the model of FIG. 2, illustrating the setting of a delta that is halfway between the original frequency and the test frequency which is added to the test frequency to obtain the next calibration frequency.

Referring now to FIG. 3, once having defined a first band edge, the next calibration frequency is set by noting the frequency $F_t$ at which the threshold is detected. Taking half the distance between this frequency and the original frequency, this Δ is used to set the next calibration frequency as illustrated frequency by $F_t+\Delta$.

Figure 4:
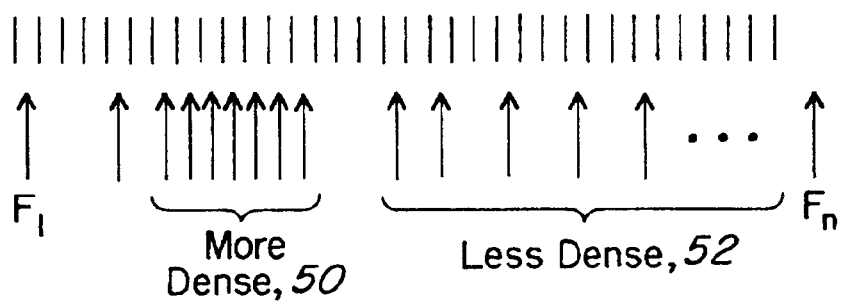
FIG. 4 is a diagrammatic illustration of the calibration frequencies specified by the system of FIGS. 2 and 3 illustrating a more dense pattern of calibration frequencies at one portion of the frequency band covered and a less dense set of calibration frequencies at a second portion of the band.

As illustrated in FIG. 4, the result is a set of calibration frequencies for the particular array on the model which has a more dense pattern of frequencies 50 at one portion of the band in question and a less dense proportion 52 at frequencies above and below this more dense frequency distribution pattern.

Figure 5:
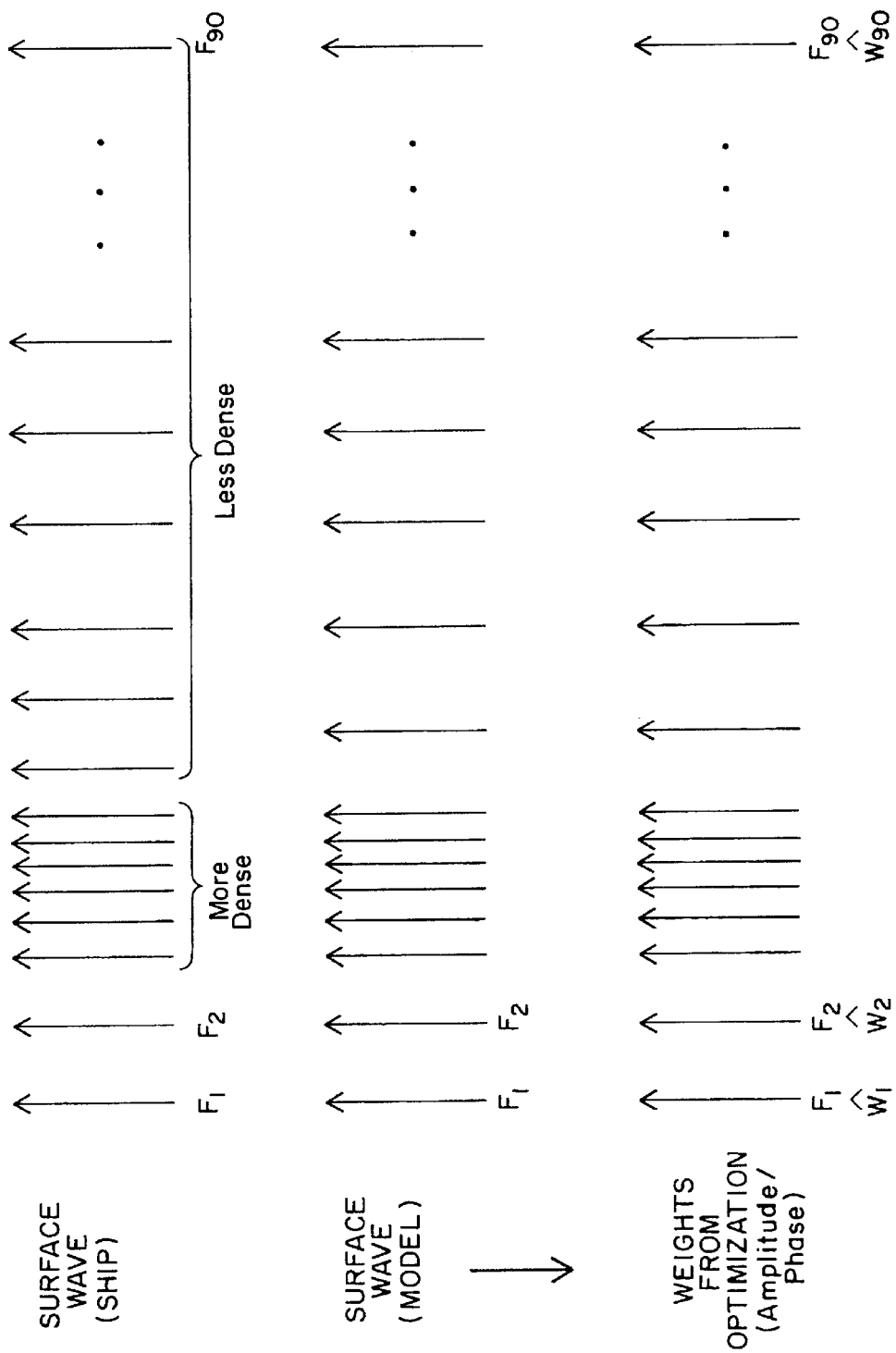
FIG. 5 is a diagrammatic illustration of the correspondence between the calibration frequencies for use on board a ship as well as the calibration frequencies for use on the model, also showing the resulting complex weights which are generated for the array manifold, with all of the frequencies designated by the process of FIGS. 2, 3 and 4 to be used as sampling frequencies for the calibration.

Referring to FIG. 5, the current method of generating weights for the array manifold or database is to take measurements both shipboard and from the model, frequency by frequency, thus to define the weights $W_1$ and $W_2 \ldots W_{90}$ for each of the 90 frequencies at which calibration measurements are to be made.

As mentioned hereinbefore, the weights are generated frequency by frequency from the difference between the shipboard calibration results and the model calibration results so as to generate the above-mentioned complex weights.

In the past, in order to obtain shipboard surface wave data, this mean turning a ship 360° for each of a set of 90 frequencies that is a time-consuming process. The purpose of so doing is to generate data that is used in combination with the model-derived data to create the complex weights stored in the antenna array manifold.

Figure 6:
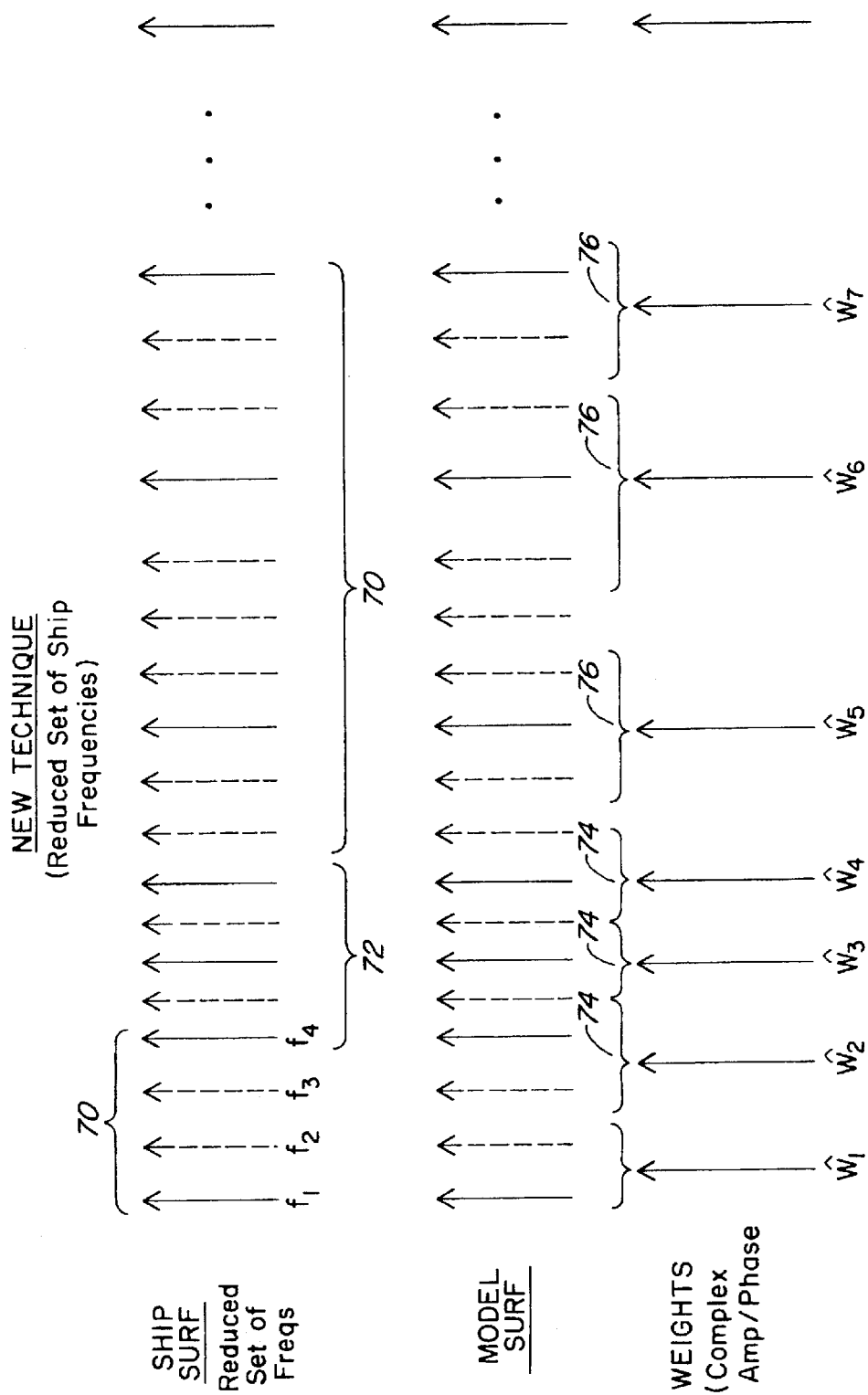
FIG. 6 is a diagrammatic illustration of a reduced set of calibration frequencies for use on shipboard as well as for the model to generate a set of weights which are broad banded enough to be valid over a band of frequencies; and, FIG. 7 is a block diagram illustrating the utilization of a reduced set of calibration frequencies to generate a final array manifold.

Referring now to FIG. 6, it will be seen that only selected frequencies are used to generate weights. Here it can be seen that, for instance, for frequencies F1, F2, F3 and F4, only F1 and F4 are used to generate the requisite weights. The reason that one can reduce the number of frequencies is that for less dense regions, here shown at 70, there need be less numbers of calibration frequencies used than were originally specified. This can be seen by weights $W_1$, $W_2$, $W_3$ . . . These weights have brackets showing the intermediate frequencies for which they are valid. In this sense, the weights are said to be broad-banded. However, for areas 72 which originally specifies a larger number of calibration frequencies, the number of actual frequencies used, while less than the original number specified, are in fact more numerous for the densely clustered frequencies than for the less densely clustered frequencies. Thus, for the band defined at 72, $W_2$, $W_3$, $W_4$ are valid in this band, whereas frequencies $W_1$, $W_5$, $W_6$ and $W_7$ are valid for the remainder of the band.

Here the bandwidths for $W_1$, $W_2$, $W_3$, $W_4$ are as illustrated at 74, which is the region over which these weights are valid; whereas bandwidths 76 are those expanded regions over which weights $W_5$, $W_6$ and $W_7$ are valid.

What will be seen is that once having picked the calibration frequencies, one can diminish the set of calibration frequencies based on the various densities for the clusters of frequencies that were originally chosen by the system of FIGS. 2, 3 and 4.

Figure 7:
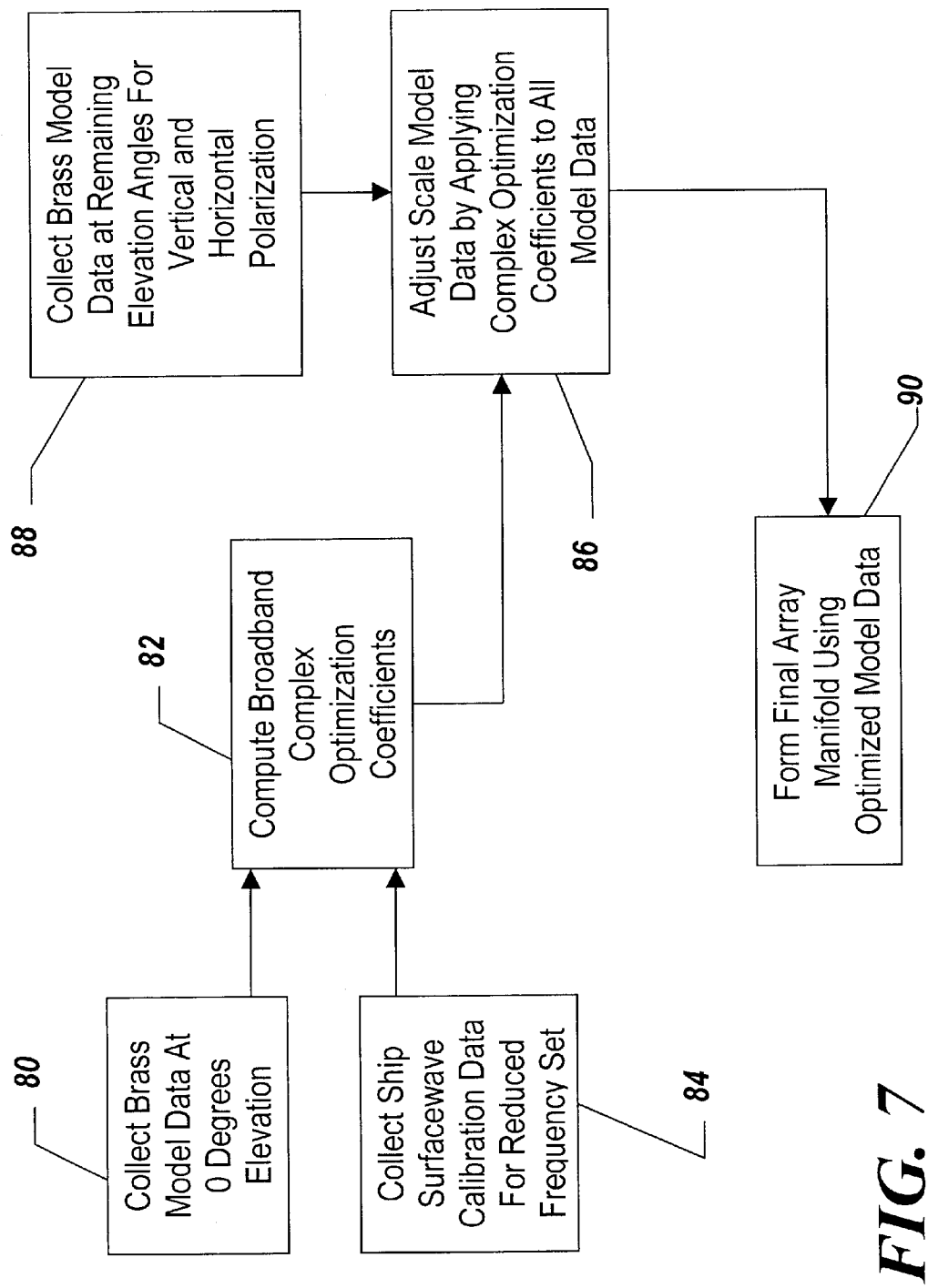

Referring now to FIG. 7, a block diagram is presented in which data collected from a brass model at 0° elevation as shown at 80 is coupled to a computer 82 to compute the broad band complex optimization coefficients using the data from unit 80 and data from a unit 84 which is data collected aboard the corresponding ship. The data is surface wave calibration data taken at a reduced frequency set.

The computed broad band complex optimization coefficients are applied to a unit 86 which adjusts scale model data by applying the complex optimization coefficients to all model data. This data is that which is collected from the brass model at remaining elevation angles for vertical and horizontal polarization as seen at 88.

The adjusted scale model data is then used to form the final array manifold using the optimized model data as illustrated at 90.

Densities

More specifically, in order to ascertain the frequency densities, the array is characterized with a model study. The first thing one generates when one designs an array for the ships is a model study, and part of that model study is to actually define the best antenna locations and the other part of it is to derive the calibration parameters. How many frequencies are needed is what this initial array characterization indicates.

The way that one understands what frequencies need to be sampled and ones that can be ignored is to take the original calibration frequency distribution data based on a model and look to see where there is very little in array response, between frequency to frequency, for the antenna pattern. Thus, for instance, for a given antenna configuration on a ship, if at a certain set of frequencies there is very little change in antenna pattern, then one need not sample frequencies about this frequency in the calculation of the weights for correcting the model data with observed data from shipboard. In short, one determines the frequencies at which the antenna pattern is changing most rapidly and then utilizes these weights in a broadband sense for adjacent frequencies within a set band. One can therefore, for instance, derive a set of weights for frequency F5 that are usable for F3 and F7. This is done by adjusting the model data with that set of weights so as to provide a database that is correct for all of the frequencies of interest. Note that, in essence, all of the data that is stored is derived from the model for the most part, the model data being corrected in order to provide reality for the shipboard scenario.

In summary, one collects all the data needed for the calibration database from the model with using a reduced set of frequencies at sea to generate a database that will meet system accuracy requirements.

Determining which Frequencies to Sample at

In order to determine at which frequencies the pattern of the ensemble of antennas changes most rapidly, a direction finding algorithm is invoked and a test model, with the output of all of the antennas on the model coupled to a direction finding unit, and with the accuracy of the source of radiation determining how fast or how slow the pattern changes. In other words, an indirect method is utilized to determine through the accuracy of the direction finding results which of the frequencies are most important to sample. Using the model, one collects data at frequency 1 and one collects data on all the antennas at that frequency for a full 360° sweep. One now migrates slightly up in frequency and collects data again on all antennas, again for a full 360° sweep. One takes this data and invokes the direction finding algorithm against the previous frequency and comes up with an RMS error over the 360° of azimuths for that frequency, with the RMS error retained. Now one moves up in frequency a little bit more and repeats the process against frequency 1 again. DFing this new set of frequencies which is higher against the base frequency that was the first one collected, one obtains another RMS error, which is a little bit higher than the previous one. This is done until one has an RMS error that approaches or hits an accuracy stop. In other words, one has a predefined accuracy at which one cannot use this frequency F1 anymore to meet the accuracy requirement. This is called the band edge, and is the halfway point between calibration frequencies.

The next test goes up twice that amount and collects data again. The "twice amount" refers to the difference between where the first process was stopped, where the accuracy requirement was met and frequency 1. This is the halfway point between two calibration frequencies. One then takes that difference, and adds it to that middle frequency or that stop frequency. This then becomes the next frequency. This process is continued up through the whole frequency band to determine where calibration frequencies should exist. This defines the calibration frequency distribution and gives the base frequency set that is needed to generate the array manifold. In short this process specifies where the 90 calibration frequencies should be.

Reduction in Frequencies

The reduction in frequencies comes from the newly found broadband capability of the complex optimization weights. One does not know specifically which frequencies can be used for the optimization weights. It has been found that there is a significant reduction of frequencies necessary because it has been found that these complex weights to have some broadband capability. The broadest band of these complex weights will occur where the base frequency set is not changing rapidly and on the other hand the more narrow band weights are going to come from frequency bands which are inherently more dense. The selection of which weights to use is such that if the frequency distribution were uniform from frequency 1 to frequency 90, then one would divide the number of frequencies by for instance 10 and use the weights that are centered around those frequencies. However, if the original model for which the antennas were characterized indicated that there was a bunching up or density of the frequencies at which measurements are to be made, and then one concentrates providing weights at those bunched up frequencies. Note that the frequency distribution comes from a modeling effort and is used before the antennas are even placed shipboard to minimize scatter effects.

In order to select the frequencies for which a weight is applicable, one looks at the density of the frequencies from the original modeling. Where the density of frequencies is high, the frequencies selected for the weights will be more numerous.

Another way to explain this is that for those dense frequencies, the bandwidth of the complex weights will be reduced. It will be appreciated that in order to reduce the frequencies that are actually sampled from 90 frequencies down to 15 or 20 frequencies, knowing that in a certain region there is an exceptionally dense frequency distribution, one would for instance sample at 10 frequencies in the dense region, whereas for the rest of the frequency spectrum one might need only to sample at five frequencies.

It will be appreciated that the exact frequency is not important for a dense frequency distribution. It is rather the fact of choosing X number of frequencies at which data is to be taken within that dense frequency range that is important.

Optimization

Because there are differences in the antenna voltage standing wave ratios (VSWRs) and other subtle differences between the full-scale antenna and the model antenna, one has to apply and utilize a process called optimization which is a process that tries to account subtle differences between the ship and the model antennas, since the model antennas are being a scaled down version of the ship antennas. It is a very simple approximation and this optimization technique is used to characterize the simple approximation. When one typically collects calibration frequencies, one has a set of 90 frequencies that are collected at sea and the same set of 90 frequencies that are collected when using the model. And so, one applies this optimization technique on a frequency-to-frequency basis. In other words, take F1 Ship to F1 Model, determine what the differences are, and save the resulting complex weighting factors which are going to be used to adjust the model data down the road. One therefore derives a set of complex optimization coefficients that are applied to the model data to make it look more like the ship data. Then, that optimized data goes into the database and is refined to provide a total set of data in an array manifold that is more representative of the ship.

The optimization process has been performed before, but it has been performed for every single frequency that one needs to collect calibration data at. The subject process uses that set of complex optimization coefficients and uses them to process data over more than one frequency. Thus the weights have more frequency bandwidth. In other words, one can take F1's optimizing coefficients and apply them to F2, F3, F4 and F5 and still end up with model data that has been adjusted by that set of optimized coefficients which will effectively give one the same accuracy as if one were doing it for each one of the frequencies individually.

As part of the subject invention, analysis was done to establish the broadband nature of these complex weights. Results confirm that, in fact, one can get broadband performance out of a set of complex weights. This in turn factors back to reducing the number of sea calibration frequencies to get the optimization factors needed to adjust all the model data.

As a result, one can take a reduced amount of shipboard data and use it to calculate or compute a complex set of weights which one applies to the 90 frequencies that one has for the model data and use that now as the database in conjunction with the sky wave segment. So, all the data one collects on the model data is adjusted by these complex weightings factors.

Weighting Factors

The weighting scheme is basically a technique that tries to maximize the correlation or the response characteristics of an antenna pattern that is taken at sea on a full-scale antenna with an antenna pattern that is taken from a model. There is a set of complex weights that can be used to adjust that model data to more closely match that antenna pattern. And it is that set of complex weights which is then applied to the model data to make it look like the shipboard antenna data.

The algorithms for generating the weights are described in a paper entitled, "Shipboard Skywave of Calibration Optimization" which gives a good overview and mathematical description of the optimization process. This paper is produced below:

Introduction

Accurate shipboard dual polarization, $(E_\Theta, E_\phi)$ calibration, (array manifold steering vector) databases are key to accurate shipboard sky wave DF. Ship model antenna range measurements are the only practical accurate way of obtaining these databases. Methods of moments electromagnetic code have been tried, but our numerical experiments on much simpler electromagnetic problems have shown errors that are several times larger than the (1 dB, 5 degree) requirement. Careful ship model measurements can approach the required accuracy, but it is difficult to accurately model the response of the deck-edge antennas since these antennas are small and have active amplifiers connected to multiple switched turn loops wrapped around small rectangular ferrite bars. Aircore loops must, however, used to model these deck edge antennas, since a 1:48 scale model of a shipboard antenna would be impractical to build. This paper describes an algorithm and presents theoretical data that shows how numerically computed weights compensates for the response differences between two different sets of antenna voltages. Weights are computed using correlation maximization, which is the objective function, used by all Correlation Interferometer Direction Finding CIDF, algorithms. The MATLAB script program Caloptz.m that performs this maximization process is added as an attachment.

Approach

Modeled aircore loops receive the fields over a different scaled volume than the shipboard antennas and have significantly different effective height values. This volume is still electrically small at scaled HF frequencies so that in itself would not cause significant modeling errors. The larger volume of these aircore loops, however, makes it impossible to install these antennas in locations that have the correct relative voltage receptions. The installed complex effective height response is dependent on the position of the loop relative to the deck edge, stanchions, passageways and other shipboard artifacts. To the first order, the response differences between deck edge antennas and scale model loops will not be wave arrival angle dependent, but will be different at each particular antenna site. A single complex weighting factor for each calibration frequency and for each site is used compensate for deck edge antenna modeling induced errors. The effective height difference between modeled and deck edge antennas is determined by comparing the ship's full-scale surface wave calibration data to the modeled surface wave data.

Effective height $h_e$ is defined here by:

Voltage($V_{50}$) across 50 ohms=$h_e \cdot 377$ ohms·total magnetic field($H_t$)     (1)

Equation 1 simply describes the obvious; the received voltage is linearly dependent on both the magnetic field and the effective height($h_e$). Modeling error correction weights are described by the, $W_r$(ifreq,iant). Note: ifreq indicates a calibration frequency index, iant indicates an antenna site.

Optimized Wr(ifreq,iant) should be approximately the same for surface wave signals and sky wave signals and almost exactly true for low elevation angle vertically polarized signals. The compensation approach described herein computes correction weights based on surface wave signals and assumes that this equality holds for all sky wave signals.

Since all surface wave data is vertically polarized let:

$V_f$(ifreq,iant,iaz) refer to shipboard recorded HF data at: frequency/antenna site/surface wave azimuth angle=ifreq/iant/iaz.

$V_m$(ifreq,iant,iaz) refer to ship model recorded data at: equivalent scaled frequency/antenna site/surface wave azimuth angle=ifreq/iant/iaz Ideally the correction weights would, over all azimuth angles($0 \leq iaz \leq 360$), establish the approximate equality:

$$W_r(ifreq,iant) \cdot V_m(ifreq,iant,iaz) \approx V_f(ifreq,iant,iaz) \quad (2)$$

Equation 2 describes a correction method, but phase measurement reference problems keep it from being implemented in any practical way. Model measurements are made relative to the reference angle of a network analyzer after transiting a lot of cable and the free space length of the antenna range. Measurements on the ship include operational receivers etc and in many cases the reference antenna is a 35' HF whip. Difference in phase references causes problems for solutions based on equation 2, but the problem disappears if we use a correlation process like CIDF that only maximizes over the absolute value of the correlation equation. This eliminates any effects due to a constant phase difference across all complex values. The relevant correlation equation for this process, at a particular azimuth=iaz, is:

$$|R(iaz)|^2 = \frac{\left| \sum_{kl}^{ku} W_r(iant) * V_m(iant, iaz) * V_f^c(iant, iaz) \right|^2}{\sum_{kl}^{ku} |W_r(iant) * V_m(iant, iaz)|^2 * \sum_{kl}^{ku} |V_f^c(iant, iaz)|^2} \quad (3)$$

Equation 3 describes the correlation squared value computed for a particular set of weights($W_r$), at azimuth angle iaz, using the antenna set $kl \leq iant \leq ku$. Calibration data is not optimized over frequency; therefore the correlation described by equation 3 is computed at a particular frequency ifreq. This index is assumed in the equation 3 and all following analysis. ( )$^c$ is the refers to the conjugate.

Ship model calibration data optimization is the process of computing the weights $W_r$ that maximize the surface wave correlations (equation 3) for a particular set of antennas. Simultaneous optimization over the set of antennas used for DF seems logical, a set that is designated here by index na. If we assume that the array size is 16 antennas, then the optimization must solve for 16 complex weights. If a single azimuth angle is used in this optimization process, then the result is a single equation having 16 unknowns, which obviously cannot be solved to yield a unique solution. In general, calibration data optimization should include more equations, i.e. azimuth angles in the correlation process than the number DF antennas. The relevant question is: what is the best way to modify equation 3 so that the number of unknowns does not exceed the number of knowns.

An obvious method is to establish an equation that has sum of correlations given by:

$$|R_{total}|^2 = |R(iaz1)|^2 + |R(iaz2)|^2 + |R(iaz3)|^2 + \ldots \quad (4)$$

and then to maximize this sum over the weights. Each correlation in equation 4 is the ratio of quadratic forms that must be independently maximized. Another solution, the one recommended here is to modify equation 4 and make it into one large single correlation equation. This resultant has the form:

$$|R_{total}|^2 = \frac{|R_{num}(iaz1)|^2 + |R(iaz2)_{num}|^2 + |R(iaz3)_{num}|^2 + \cdots}{|R_{den}(iaz1)|^2 + |R_{den}(iaz2)|^2 + |R_{den}(iaz3)|^2 + \cdots} \quad (5)$$

Equation 5 is single equation that is the ratio of quadratic forms that can be maximized in closed form over the weights. Each independent denominator term in equation (5) can be simplified if we independently normalize the full-scale ship data at each azimuth point. This normalization sets:

$$\sum_{i}^{na} |V_f^T(iant, iaz)|^2 = 1.0 \quad (6)$$

Each denominator term in equation 5 is then:

$$|R_{den}(iazk)|^2 = \sum_{i}^{na} |W_r(iant) * V_m(iant, iazk)|^2 \quad (7)$$

And each numerator term in equation 5 is:

$$|R_{num}(iazk)|^2 = \left| \sum_{i}^{na} W_r(iant) * V_m(iant, iazk) * V_f^c(iant, iazk) \right|^2 \quad (8)$$

The number of terms in equation 8 goes as the square of the number of antennas, for 16 antennas this number is equal to 256. As azimuth values are summed, the terms having common weight products are added. Partial sums for the ith and jth antenna indices at azimuths iazk and iazl have terms given by:

$$W_r(i)*W_r^c(j)\{V_m(i,iazk)*V_f^c(j,iazk)*V_m^c(i,iazk)*V_f(j,iazk)+V_m(i,iazl)*V_f^c(j,iazl)*V_m^c(i,iazl)*V_f(j,iazl)\} \quad (9)$$

Summation forms, such as that described in equation 9, set up the ratio of quadratic forms. Maximization over all of these weights involves many complex weight products. The solution key can be found by formulating this ratio in a form developed for adaptive array analysis. The relevant techniques are described below.

Array copy signal-noise-ratios (SNRs) are readily computed if the internals; Rss (the signal covariance matrices), Rnn (the noise covariance matrices) are known and W the beam forming weights are specified. The result is the ratio given by:

$$SNR = \frac{W^T R_{ss} W}{W^T R_{nn} W} \quad (10)$$

Equation 10 is a ratio of quadratic forms, which takes on a maximum value for a particular set of weights. For these weights, this maximum is the maximum eigenvalue of the well-known product [1]:

$$(R_{nn})^{-1} * R_{ss} \quad (11)$$

Let this maximum eigenvalue be equal to $\lambda_{max}$. The (W) weights that will generate this maximum are given by the eigenvector associated with zero eigenvalue of:

$$[R_{ss} - \lambda_{max} R_{nn}][W] = 0 \quad (12)$$

The closed form maximization of equation 5 can be accomplished if it can be written in a $$R_{ss} = \sum^{iaz(total)} V_m(1:na, iaz) * V_f^c(1:na, iaz)(V_m(1:na, iaz) * V_f^c(1:na, iaz))^T$$

matrix form similar to equation 10. A little algebra shows that equation 5 can be put into this form. The Rss matrix is given by the sum of outer products:

$( )^T$ refers to the conjugate transpose. The $R_{nn}$ matrix is diagonal with terms given by:

$$R_{nn}(j, j) = \sum^{iaz(total)} |V_m(j, iaz)|^2 \quad (13)$$

Numerical Experiments

MATLAB program caloptz.m shows the operation of this algorithm. This program closely follows the theoretical optimization process and terminology described in equations 5–14. Theoretical voltages generated by the ESP methods of moments were used as inputs. These theoretical voltages were generated across the terminals of the slanted loops were spaced off a set of octagonal plates. $E_\theta$ the vertically polarized set was used in these numerical experiments. This array has complete 8-way symmetry, therefore, seven 45 degree offsets of the single full 360 degree pattern, listed in espot.dat, was used to generate the required 7 antenna additional complex patterns. These voltages are identified Verf(iant,iaz) which would correspond to the accurate full scale shipboard calibration data. This one wavelength diameter octagonal array has previously been used in a number of numerical experiments. Each of the eight antenna voltages were modified by a multiplication by eight different complex error weights; Wcer(iant,1) which results in voltages that would represent model measurements Verm(iant,iaz) that include errors. Wcer(iant,1) error coefficients are generated with the aid of a multiplication term= ampu. All Wcer(:,1) terms are equal to unity when ampu is set to zero. Noise at a chosen SNRdB level is added to the synthetic model data to make the computations more realistic. The test is: does the optimization program correct for the errors induced into the model data, and how many azimuth optimization angles need to be included in the optimization program?

Numerous interesting experiments can be conducted with the caloptz.m. This program shows large correlation improvements. Without noise, the corrections are perfect. These correlation increases from an SNR of 60 dB to 20 dB were achieved with an azimuth optimization set of 15 angles. An interesting effect was noted that optimization could be achieved with smaller azimuth optimization sets than the number of antennas.

References

[1] R. A Monzingo and T. W. Miller, Introduction to Adaptive Arrays, Wiley, New York, 1980. pp 90–97.

In summary, the present system takes each individual calibration frequency, calculates a set of complex weights using the shipboard surface wave data and the model surface wave data; and then takes those complex weights and applies them to the sky wave model data to adjust that data to make it look more like the ship. The subject technique then uses this to develop the array manifold.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for reducing the time a ship must be maintained on station during a run to gather data for the calibration of an array of direction finding antennas located on the ship and coupled to a direction finding system, comprising the steps of:

determining an optimal set of calibration frequencies for the calibration of the array; and, using a reduced set of the optimal set of calibration frequencies for gathering the shipboard data.

2. The method of claim 1, wherein the optimal and set of calibration frequencies has more dense and less dense numbers of calibration frequencies in selected regions of the electromagnetic spectrum, and wherein the number of calibration frequencies of this reduced set are more numerous in the more dense regions.

3. The method of claim 2, wherein the more dense calibration frequency regions are regions where the antenna array characteristics change rapidly with azimuth angle of received signals.

4. The method of claim 3, wherein the array characteristics changes are due to resonance phenomena.

5. The method of claim 1, wherein the reduced set of calibration frequencies is used for shipboard data collection of surface waves.

6. The method of claim 5, wherein the calibration process includes using shipboard collected surface wave data in combination with data collected from a scale model of the ship to produce an array manifold of data used to compensate the output of the array.

7. The method of claim 6, wherein the data in the manifold for compensating the array includes complex weights.

8. The method of claim 7, wherein the complex weights are valid over a number of calibration frequencies, whereby the complex weights have broadband characteristics.

9. The method of claim 6, wherein the surface wave data from the ship is combined with surface wave and sky wave data from the model to generate the array manifold.

10. A method for selecting calibration frequencies for calibrating an antenna array aboard a ship coupled to a direction finding system in which an optimal set of calibration frequencies for the array has been specified, comprising the steps of:

determining in what regions of the electromagnetic spectrum there are higher densities of the calibration frequencies in the optimal set; and, using a reduced set of the optimal set of calibration frequencies to calibrate the antenna array, the reduced set having more calibration frequencies where there are higher densities of the calibration frequencies in the optimal set and less calibration frequencies where there are lower densities of the calibration frequencies in the optimal set, whereby the calibration frequencies in the reduced set are chosen based on measured response characteristics of the antenna array.

11. The method of claim 10, wherein shipboard data collected is used to generate an array manifold used to compensate the output of the array, the array manifold including complex weights, the complex weights being broad banded to be valid for more than one calibration frequency in the reduced set.

12. The method of claim 11, wherein the bandwidth of a weight is dependent upon how quickly the antenna array output changes with azimuth of an incoming signal.

13. The method of claim 12, wherein the array output changes is at least in part due to resonance phenomena.

* * * * *